3,128,302
SYNTHETIC LUBRICANTS
Thomas W. Martinek, Crystal Lake, Ill., assignor to The Pure Oil Company, Chicago, Ill., a corporation of Ohio
No Drawing. Filed June 26, 1959, Ser. No. 822,992
13 Claims. (Cl. 260—475)

This invention relates to synthetic lubricants comprising mixed esters of complex, polyfunctional, high-molecular-weight aromatic compounds and their preparation from solvent extracts. A particular object of this invention is to provide superior synthetic lubricants having excellent lubricity and high thermal stability, prepared by esterifying complex, polybasic, polynuclear, aromatic acids derived from solvent extracts by reaction with an alkali metal in the presence of an "active solvent," followed by conversion of the resulting metal-aromatic complexes to polybasic acid salts by reaction with carbon dioxide, hydrolysis or acidification of the resulting salt to form the free acids, and separation of the acids from the unreacted oil for esterification. The esterification reaction is accomplished in a conventional manner by reaction of the resulting mixed acids with a monohydric alcohol or phenol or related compounds.

It is known in the art that free alkali metals react with a wide variety of aromatic hydrocarbons to form the metal complex thereof. The reaction has not become one of technical importance because of difficulties in obtaining adequate yields and the fact that the starting materials are expensive. Schlenk, in Annalen 463, 90–95, reports that lithium reacts with naphthalene in ethyl ether solution to form the alkali metal complex, or addition compound, in detectable quantities only after 8 days' reaction time. The same reaction with diphenyl required 14 days. Sodium failed to give a detectable reaction with either of these hydrocarbons in a matter of months. This is attributed to the possible poisoning effect on the alkali metal of sulfur compounds present in even the best grades of such hydrocarbon starting materials. Using ammonia as the solvent is equally ineffective because of the side reactions forming sodamide.

Scott in United States Patents 2,023,793; 2,019,832 and 2,054,100, and Walker in Patent 2,033,506 report separately that the solvent affects the reaction and the hydrocarbon feed should be partially hydrogenated before the reaction is carried out. This prior art is confined to the use of severely purified hydrocarbon starting materials. Regardless, the yields are low, particularly because of the large amount of poly-addition compounds formed which consume a large amount of the alkali metal.

These and prior art investigators make no mention of the use of mixtures of esters prepared from selected petroleum fractions or to their use as synthetic lubricants. Furthermore, no reference is made to the fact that certain members of this class of materials are extremely resistant to decomposition at high temperatures.

Accordingly, the essential feature of this invention is the discovery that alkyl, aromatic and cyclo-alkyl esters of complex, polybasic, polynuclear aromatic acids derived from solvent extracts are good synthetic lubricants. In accordance with this invention, it has been discovered that solvent extracts rich in complex, polynuclear, high-molecular-weight aromatic compound, and containing mixed hydrocarbon substituent groups attached to the rings, can be transformed into acids and the acids esterified by reaction with monohydric alcohols, phenol and naphthols to produce useful products. A source of complex, polyfunctional, aromatic hydrocarbons from which the esters may be derived comprises solvent extracts obtained as by-products from the refining of mineral oils.

For example, a preferred source of the above-defined complex hydrocarbons comprises the extracts obtained in the solvent refining of lubricating oil fractions. These extracts, hereinafter referred to as solvent extracts, are obtained as the extract or solvent phase when lubricating oils are refined by treatment with a selective solvent having an affinity for the aromatic compounds. The complex hydrocarbons removed by this refining treatment are generally characterized by being compounds of carbon and hydrogen containing appreciable amounts of sulfur, nitrogen and oxygen. These complex hydrocarbons contain a predominance of complex polynuclear rings of aromatic structure having hydrocarbon substitutent groups attached thereto as side chains. These starting materials are of a generally viscous nature, have low viscosity indices, inferior resistance to oxidation, and are considered to be deleterious in lubricating oils.

Heretofore, solvent extracts have been regarded as waste products and, because of their content of petroleum resins and various sulfur-, oxygen-, and nitrogen-containing compounds and complexes, have not been used successfully in preparing petrochemicals, or as sources of hydrocarbon reactants or starting materials. It has been discovered that despite these draw-backs and previous art showing unsuccessful attempts at their utilization, solvent extracts from lubricating oil manufacture can be reacted with alkali metals in the presence of certain solvents to form complexes with the alkali metal from which, by reaction with carbon dioxide, alkali metal salts of mixed carboxylic acids can be formed. The acids from these salts can then be esterified to form synthetic lubricants. It has been found that the esterified reaction mixture contains a predominance of esters of complex, polybasic, polynuclear, aromatic carboxylic acids which are useful in forming various resins and as lubricating oils per se.

Accordingly, it becomes a primary object of this invention to provide a synthetic lubricant comprising esters of mixed acids containing a predominance of complex, polynuclear aromatic groups.

Another object of this invention is to provide a composition containing alkyl, aryl, and cyclo-alkyl esters of mixed carboxylic acids obtained from solvent extracts, which extracts are the by-product of the solvent extraction of mineral lubricating oils and their fractions.

A further object of this invention is to provide a composition comprising mixed alkyl, aryl, and cyclo-alkyl esters of complex, polynuclear, aromatic carboxylic acids from solvent extracts obtained as by-products in the refining of mineral lubricating oils and their fractions.

Still a further object of this invention is to provide a synthetic lubricating oil comprising mixed esters of complex, polynuclear, aromatic carboxylic acids.

Another object of this invention is to provide a synthetic lubricant prepared in situ in a solvent extract by reaction of said solvent extract with an alkali metal and carbon dioxide, followed by acidification and esterification of the resulting mixed complex polynuclear aromatic carboxylic acids.

These and other objects of the invention will become apparent or be described as the specification proceeds.

The starting materials used in accordance with this invention to prepare new ester compositions are well known in the art and are adequately described as those aromatic materials separated from mineral lubricating oils and their fraction, i.e., those aromatics obtained in the refining of neutral oils and bright stocks during treatment with a selective solvent designed to extract the predominantly aromatic materials from the paraffinic materials, or mineral lubricating oil fractions containing such polynuclear aromatics prior to refining. Solvent extracts resulting from the treatment of mineral lubricating oils for the purpose of separating non-aromatic hydrocarbons (the raffinate and finished oil) from the aromatic hydrocarbons (the extract and waste product) are preferred as starting materials.

Since the general process of refining mineral lubricating oils in which solvent extracts are obtained is well known, it is only necessary for present purposes to describe a typical procedure for obtaining same and give some examples by way of illustration.

In a typical operation, desalted crude oil is first charged to a distillation unit where straight-run gasoline, two grades of naphtha, kerosine, and virgin distillate are taken off, leaving a reduced-crude residue. The reduced crude is continuously charged to a vacuum distillation unit where three lubricating oil distillates are taken off as side streams, a light distillate is taken off as overhead, and a residuum is withdrawn from the bottom of the tower. This residuum is charged to a propane deasphalting unit wherein propane dissolves the desirable lubricating oil constituents and leaves the asphaltic materials. A typical vacuum residuum charge to the propane deasphalting unit may have an API gravity of 12.9°, viscosity SUS at 210° F. of 1249, flash 585° F., fire 650° F., C.R. of 13.9 weight percent and is black in color. The deasphalted oil may have an API gravity of 21.5° to 21.8°, viscosity SUS at 210° F. of 165–175, NPA color 6–7, flash 575° F., fire 640° F., and C.R. of 1.7–2.0. The deasphalted oil and various lubricating oil distillates from the reduced crude are separately subjected to solvent extraction for the separation of non-aromatic from aromatic constituents. The refined oil or "raffinate" from such processes is used per se, or as blending stock, and the solvent extract, containing predominantly aromatic constituents, is the material found useful in accordance with this invention.

For example, a crude oil from an East Texas field with an API gravity of 33.1 was topped to remove such light fractions as gasoline, naphtha, kerosine, and a light lubricating distillate. The vacuum residue was a reduced crude having a viscosity of 1251 SUS at 210° F., 2.2 percent sulfur, and an API gravity of 12.6. After propane deasphalting, the oil had a viscosity of 174 SUS at 210° F. and an API gravity of 21.7. This deasphalted oil was treated with phenol to produce a raffinate from which an aviation lubricating oil can be produced. The extract phase from this phenol treatment after removal of phenol is ready for use as the starting material in accordance with this invention.

Other solvents than phenol may be used to obtain the extraction product used in accordance with this invention; for example, liquid sulfur dioxide, nitrobenzene, Chlorex, chlorophenol, trichloroethylene, cresylic acid, pyridine, furfural or the Duo-Sol solution comprising liquid propane, and cresol may be used. When using phenol, it is possible to vary the characteristics of the extraction product considerably by adjustment of the amount of water present. A fraction of low viscosity index can be obtained by using a water solution of phenol during the extraction, and a fraction of high viscosity index can be obtained by using anhydrous phenol. Following are the physical characteristics of typical extraction products from lubricating oil stocks derived from various crude oils, and other source hydrocarbon materials which may be used in accordance with this invention.

TABLE I

*Sources and Physical Characteristics of Solvent Extracts and Other Source Materials*

| Ext. No. | Crude Source | Solvent | API Gravity | Sp. Gr. @ 10° F. | Vis./ 100° F. | Vis./ 130° F. | Vis./ 210° F. | V.I. | Pour | ° F., Flash | ° F., Fire | Iodine No. (Wijs) | Percent C.R. | Percent Sulfur |
|---|---|---|---|---|---|---|---|---|---|---|---|---|---|---|
| 1 | East Texas | Phenol | 11.1 |  | 23,319 | 4,750 | 282 | −40 | +55 |  |  |  | 7.2 | 2.66 |
| 2 | do | do | 15.4 |  | 15,000 |  | 285 | +39 |  |  |  |  |  |  |
| 3 | do | do | 12.6 |  | 36,410 | 4,310 | 310.1 | −1 | +80 |  |  |  | 4.7 | 2.27 |
| 4 | do | do | 14.6 |  | 19,500 | 4,305 | 313 | +27 | +90 |  |  |  | 4.7 | 2.2 |
| 5 | do | do | 15.4 |  | 32,500 |  | 372 | +5 | +60 |  |  |  | 4.13 | 2.33 |
| 6 | do | do | 13.7 |  | 25,000 | 5,400 | 355 | +27 | +80 |  |  |  |  | 2.18 |
| 7 | do | do | 8.6 |  | 145,000 | 19,000 | 616 | 0 | +70 |  |  |  |  |  |
| 8 | do | do | 10.5 |  | 12,676 | 2,514 | 172.1 | −101 | +60 |  |  |  |  | 2.88 |
| 9 | Santa Fe Springs | do | 10.2 | 0.9984 |  |  | 371 |  | +65 | 520 | 600 | 69.4 |  |  |
| 10 | Texas | Furfural | 13.0 | 0.9791 |  |  | 1,500 |  | +85 | 470 | 515 | 57.1 |  |  |
| 11 | Penn | Chlorex | 12.2 | 0.9843 |  |  | 1,365 |  | +85 | 560 | 630 | 71.4 |  |  |
| 12 | do | Nitro-Benzene | 10.0 | 1.000 |  |  | 1,500 |  | +75 | 555 | 640 | 60 |  |  |
| 13 | Mid-Cont | Propane-cresol | 14.4 | 0.9699 |  |  | 1,500 |  | +100 | 540 | 605 | 63.7 |  |  |
| 14 | do | Phenol | 13.6 |  |  |  | 41.7 | −82 | +20 |  |  |  |  |  |
| 15 | do | Chlorex | 13.6 |  |  |  | 200 | −61 | +75 |  |  |  |  |  |
| 16 | do | Phenol | 8.9 |  |  |  | 569 |  | +75 |  |  |  |  |  |
| 17 | do | Furfural | 14.9 |  |  |  | 50.2 | 25 | +20 |  |  |  |  |  |
| 18 | East Texas | Phenol | 13.5 | .976 | 25,000 |  | 341 | 17 | +65 | 530 | 610 |  | 5.76 | 2.36 |

The solvent extracts from lubricating oils used as starting materials for this invention have the following general properties and characteristics.

TABLE II

| Characteristic: | Range of value |
|---|---|
| Gravity, ° API | 8.0–15.0 |
| Gravity, sp., 380/15.5° C | 0.9550–1,000 |
| Viscosity, SUS, @ 100° F | 350–25,000 (ext.) |
| Viscosity, SUS, @ 130° F | 140–19,000 |
| Viscosity, SUS, @ 210° F | 200–1500 |
| Viscosity index | −101–+39 |
| Pour point (max.) | +35–100 |
| Color, NPA | +2–5D |
| Molecular weight, average | 320–600 |
| Boiling point (initial), ° F | 300–1000 |
| Boiling point (end), ° F | 400–1200 |
| Sulfur, percent wt | 2.0–4.5 |
| Sulfur compounds, percent wt | 20–50 |
| Aromatics and thio compounds | 50–90 |
| Thio compounds (volume percent) | 14–40 |
| Neutral aromatic hydrocarbons | 40–51 |
| Av. No. of rings/mean arom. mol | 1.7–3.5 |
| H/C wt. ratio | 0.116–0.136 |
| H/C atom ratio, whole sample | 1,383–1.622 |
| H/C atom ratio, aromatic portion | 1.289–1.500 |
| Nearest empirical formula | $C_{22}H_{30}$—$C_{44}H_{66}$ |

The gravities of the extracts in general increase with increase in the viscosity of the raffinate at a constant viscosity index. Stated otherwise, the gravities of these extracts increase with decrease in viscosity index of the raffinate at a constant viscosity. For the production of 100±5 V.I. neutral oils, the viscosities of the extracts increase with increase in stated viscosities of the neutral oils (raffinates). The pour points of extracts are high and are affected by changes in the depth of extraction. The sulfur contents are also affected by the depth of extraction. The solvent extracts are characterized by containing aromatic and sulfur compounds in the range of 70–90%, the remainder being principally saturates, or material behaving as saturates, together with a minor proportion of from 3.0 to 6.0% organic acids. The organic acids present are not susceptible to extraction by the use of aqueous strong caustic because of emulsion formation. Very little asphaltic material is present in solvent extracts and they contain no materials volatile at room temperatures.

The materials shown in Table I and II are merely illustrative and the invention is not to be limited thereby.

It is apparent that the composition and characteristics of the acids or acid derivatives prepared in accordance with the present process will vary somewhat depending on the concentration and types of complex polynuclear aromatic hydrocarbon in the extracts used. In such complicated mixtures as solvent extracts from petroleum oils and solvent extracts from lubricating oils, the content of reactable aromatic materials may vary from about 50% by weight to 100% by weight.

It is to be understood, accordingly, that the invention is broadly applicable to any petroleum fraction which contains at least about 50% by weight of complex polynuclear aromatic hydrocarbons as herein defined. These types of complex aromatic hydrocarbons are found in high concentrations in solvent extracts obtained in the manufacture of neutrals and bright stocks, all of which materials are to be understood as suitable starting materials. One advantage in carrying out the present invention is the fact that the products are prepared in situ in a mineral oil solution which may be used as such, thus eliminating the necessity of extracting the hydrocarbon reactants. Another advantage is that the process of this invention becomes a method of refining wherein the complex aromatic hydrocarbons may be removed from petroleum fractions containing same.

It is to be understood that the invention is particularly applicable to any solvent extract from the refining of mineral lubricating oils for the purpose of separating non-aromatic and aromatic hydrocarbons, that is, where the solvent exerts a preferential selectivity for the non-paraffinic constituents, the resulting extract will apply and be useful in the present invention. The extracts are substantially freed of solvent, e.g., phenol extracts are dephenolized by steam stripping so that they contain practically no solvent.

In carrying out the process of this invention, the starting material is first transformed into a carboxylic acid containing one or more carboxyl groups. This is accomplished in accordance with the process disclosed in copending application Serial No. 819,932, filed on June 12, 1959, and now abandoned, wherein the starting material is reacted first with an alkali metal in elementary form. For this purpose sodium, lithium, potassium, rubidium and cesium may be used, that is, members on the left hand side of Group I of the Periodic Chart of the Atoms, Hubbard, 1941, Revised Chart. About 30 parts of solvent extract are used per 1 to 5 parts of alkali metal. The reaction is carried out at ambient temperature, or at temperatures as low as $-60°$ C. and as high as $80°$ C. The prior art solvents for this type of reaction, such as dimethyl glycol ether, dimethyl ether, methyl alkyl ethers, dialkyl glycol ethers, tetrahydrofuran, dioxane and trimethylamine may be used.

In accordance with said copending application, it has been found that the reaction of the alkali metal with the desirable reactive components does not occur unless steps are taken to overcome the effects of the reactive impurities in the complex mixture which normally coat the sodium surface and prevent reaction. The undesirable reactive impurities present in the mineral oil mixture may be traces of water, organic acids (such as naphthenic acids) mercaptans, sulfides, other sulfur compounds, phenol and other nitrogen- or oxygen-containing compounds. I discovered, however, that the desired reaction can be effected if fresh sodium surfaces are continually exposed until all undesired reactive impurities have reacted, or if sufficient sodium surface to react with all such impurities, plus a moderate excess, is used. Another expedient is to use a large excess of sodium metal. It appears that once the undesired reactive impurities have reacted, the desired reaction can take place on the excess clean sodium surface. It also appears that once the desired reaction occurs, the complex solution begins to dissolve the undesired reaction product coating from the sodium surface, in effect cleaning the particle surface and rendering more surface available for reaction.

It is also therein stated that the reaction is difficult to start unless an excess of sodium surface is used. Certain expedients have been found advantageous. Among these are continuous shearing of the sodium particles until the reaction starts. This has been accomplished by using a Brookfield counter-rotating stirrer. Other shearing or crushing devices such as a Waring Blendor, colloid mills, mullers, ball mills, and the like, may be used. Even with continual shearing or crushing, many minutes and sometimes hours are required before the desired reaction starts. The length of time required depends on the relative amounts of undesired impurities present, and the sodium surface made available. The inhibiting or dominating effect of the undesirable reactive impurities is one reason why petroleum hydrocarbon sources are not exploited as starting materials for this type of reaction.

Another expedient found advantageous in accordance with the copending application resides in the use of a preformed sodium dispersion in an inert liquid. Such dispersions and their preparation are well known in the art. I have found, however, that a large excess of dispersed sodium must be used to initiate the reaction, unless steps are taken to remove the coating of undesired reaction products from the sodium surface. Such steps include the use of mills.

Still another expedient, and the preferred one in this related application, is the actual preparation of a sodium dispersion in the mineral oil fraction, component, or by-product to be reacted. The undesirable impurities appear to completely react with the sodium during preparation of the dispersion, and as a consequence, clean sodium surface is available for the desired reaction as soon as the "active ether" is mixed with the sodium-reactive component mixture. The desired reaction then is practically instantaneous and proceeds smoothly and rapidly to completion with a slight excess of sodium.

When the reaction with the alkali metal is complete, as evidenced by its dissolution, the reaction mixture is treated with carbon dioxide at about the same or a different temperature as was used during the reaction with the alkali metal. The reaction mixture is next washed with water and allowed to separate in a solvent phase and a water phase. Several applications of 20 ml. of water per 100 ml. of reaction mixture may be used and the water layers collected. Counter-current water-washing may be used. The resulting water phase is acidified with an acid such as a hydrohalide, sulfuric acid, nitric acid or phosphoric acid. This causes the di-, and/or polynuclear aromatic acids and their complexes to separate or precipitate from the reaction mixture.

The esters of the resulting mixed acid solution are prepared by mixing and heating at least a stoichiometric amount, and preferably an excess amount, of a compound containing an hydroxyl group, i.e., an aliphatic alcohol, a phenol or naphthol, with the acid derivatives. The temperature of the esterification reaction is about $100°$ to $250°$ C. and should be at least sufficient to allow the withdrawal of water vapor from the reaction.

The esterification procedure may follow the Fischer esterification method wherein the polyfunctional aromatic acid mixture is refluxed with an excess of the alcohol in the presence of about 1–5% of dry hydrogen chloride or sulfuric acid as a catalyst. By this procedure, high yields of pure esters are obtained. The reaction proceeds more readily with normal or primary alcohols and is slower with secondary alcohols and tertiary alcohols.

The silver-salt method may also be applied where direct, acid-catalyzed esterification proceeds too slowly or is ineffective. In this method, the dry silver salt of the polyfunctional aromatic acid is reacted with an alkyl halide. The alkyl group of the alkyl halide follows the general definition of the alcohols heretofore set forth. Similarly, the polyfunctional aromatic acids may be esterified by using diazomethane in an ether solution although this method may be more expensive.

Examples of compounds containing an hydroxyl group are aliphatic alcohols, as for example alkanols, having an alkyl group containing 1 to 18 carbon atoms, and include methyl, ethyl, propyl, butyl, isobutyl, pentyl, isopentyl, hexyl, isohexyl, heptyl, octyl, diisooctyl, lauryl and stearyl alcohols. The aromatic alcohols include benzyl alcohol, benzhydrol, triphenylcarbino, phenol, cresols, xylenols, dihydric phenols, and naphthols. The esterifying alcohol may contain more than one hydroxyl group, and may contain other substitutents. Accordingly, such esterifying agents as monoethanolamine, diethanolamine, and glycols may also be used. As a specific example of our invention, a mixture of esters from aromatic extract oil derived from the preparation of 170 vis. (100° F.), 100 V.I. neutral oil was prepared by the following procedure.

EXAMPLE 1

A mixture of complex polybasic acids having a saponification value of 221 and an average molecular weight of 630 was prepared as follows:

A dispersion of 830 g. of sodium in 2400 g. of toluene was prepared and added (over a twenty minute period) to 10,000 g. of an aromatic extract oil (from the preparation of 170 vis. (100° F.), 100 V.I. mineral oil) dissolved in 58,000 g. of tetrahydrofuran. The reaction was conducted in a closed iron vessel at a low temperature of $-30°$ C. Carbon dioxide gas was passed over the surface of the rapidly stirred mixture until an excess of gas had been absorbed. Then the tetrahydrofuran solution was filtered, and the solvent was stripped from the filtrate. The residue was diluted with ether and extracted with water, the aqueous extract was acidified to precipitate the acids, the precipitated acids were taken up in ether and washed with water, and the ether was stripped from the solution, leaving an amber solid residue of 2500 g. of mixed, complex organic acids.

When 500 g. of this mixture is charged to a two-liter, three-neck flask, and refluxed with 370 g. of n-butanol, while withdrawing water vapor until 35 g. of water have been removed, and the excess butanol is distilled and stripped from the reaction mixture, a yellow, fluid residue is left which is non-volatile at 180° C. at 2 mm. Hg pressure, and possesses excellent lubricity.

EXAMPLE 2

A second batch of mixed acids having a saponification value of 186 and an average molecular weight of 680 was prepared in a manner similar to that whereby the acids of Example I were prepared, except that the oil-to-sodium ratio was 18 instead of 12. A 300 g. portion of these acids is combined with 280 g. of stearyl alcohol in a reaction vessel, and esterification is achieved by stripping water from the reaction mixture at 160° C. and 2 mm. Hg absolute pressure. Then about 9 g. of excess alcohol are removed by distillation and stripping at 180° C. and 2 mm. Hg pressure. The residue is a light yellow fluid suitable for use as a lubricant, but is relatively unstable to oxidation, especially at high temperatures. Oxidation and thermal stability can be improved by hydrogenation.

EXAMPLE 3

The esters of Example 2 are diluted with benzene and passed through a platinum catalyst bed at 139–316° F., under a hydrogen pressure of 400–700 p.s.i.g. Then the benzene is removed by stripping, leaving a liquid residue which is light-colored, thermally stable, and oxidation-resistant. It exhibits high lubricity and is suitable for use as a high-temperature lubricant.

EXAMPLE 4

The esters of Example 1 are converted to a more aromatic structure by brominating them to form the tetrabromo derivative which then is debrominated with zinc dust suspended in 95% ethanol (other methods can be used), to improve the thermal and oxidation stability. Improved color and stability also result. These esters are suitable for use as high-temperature lubricants and have superior lubricities to those of ordinary synthetic lubricants of the class of esters of dibasic organic acids. In addition, it is believed that these esters are more resistant to the effect of radiation.

EXAMPLE 5

A mixture of complex polybasic acids prepared in accordance with Example 1 in an amount of about 500 g. is charged to a two-liter, three-neck flask and refluxed with about 400 g. of phenol. Water vapor formed during the reaction is distilled off and stripped from the reaction mixture. A fluid residue is produced which is non-volatile at 200° C. at 2 mm. Hg pressure, and possesses excellent lubricity.

EXAMPLE 6

A mixture of complex polynuclear acids prepared in accordance with Example 1 in an amount of about 500 g. is charged to a two-liter, three-neck flask and refluxed in the presence of 2% by volume of hydrogen chloride with about 500 g. of naphthol. The water vapor formed during the reaction is taken off and a fluid residue results having the essential properties of a lubricant.

EXAMPLE 7

About 1000 g. of a mixture of complex polynuclear acids prepared in accordance with Example 1, having a saponification value of 186 and an average molecular weight of about 700, is placed in a three-neck, round-bottom flask and heated to about 200° C. with about 1000 g. of beta-naphthol in the presence of about 0.5% by volume of 97% sulfuric acid. The mixture is refluxed for about 4 hours while the water formed is stripped from the reaction mixture. A fluid amber-colored product results which is non-volatile at 200° C. and is one of the essential products of this invention.

EXAMPLE 8

The process of Example 2 is repeated using methyl alcohol. The mixture is heated to about 185° C. for 2 hours resulting in a product containing methyl carboxy groups.

A further aspect of this invention comprises the steps of hydrogenating any double bonds that may be present in the acids for the purpose of increasing their chemical stability. Also, by dehydrogenating the rings which may contain olefinic bonds the compounds are rendered more aromatic. In addition to improving the stability, it is anticipated that dehydrogenation will also increase the radiation resistance of the resulting esters. For example, a double bond can be hydrogenated by passing the mixed esters through a bed of platinum catalyst at elevated pressure of about 10 to 100 p.s.i. of hydrogen and elevated temperatures of about 90° to 225° C. The resulting product will be highly aromatic and more stable.

Alternately, a solution of the acids prior to esterification, contained in a hydrocarbon solvent such as benzene or toluene, can be passed through a bed of platinum catalyst in the presence of hydrogen or an aqueous solution of the metal salts of the acids can be hydrogenated prior to acidification and separation of the acids. In addition to saturating the double bond, the foregoing hydrogenation reaction reduces the sulfur content of the mixture and greatly improves its color. For purposes of desulfurization, such catalysts as cobalt molybdate or alumina or silica-alumina bases and related desulfurization catalysts may be used.

Although a ring containing an olefinic linkage can be dehydrogenated to make it more aromatic and hence more stable, such reactions may cause simultaneous decarboxylation. Fractions of the mixed esters, or mixed esters from a particular source of solvent extracts which are sensitive to decarboxylation, may be improved by a process of dehydrohalogenation. For example, a halogen such as bromine readily adds to the olefinic link in the ring and at the same time by substitution replaces hydrogen with halogen on the carbon atoms vicinal to the double bond. This produces a tetrabromo derivative which then can be dehalogenated with zinc dust to form the conjugated unsaturated bonds of an aromatic structure.

In general, the amount of alkali metal used in the reaction is based on the reactable amounts of complex, polynuclear aromatic compounds and sulfur compounds present in the petroleum fraction or source material used. The amount of alkali metal should be sufficient to react with both the sulfur, oxygen, and nitrogen compounds and the complex polynuclear aromatic compounds. This amount can be determined by conducting batch runs using different proportions of alkali metal. It is preferred to use an excess of alkali metal over stoichiometric requirements. In general, about 1% to 20% of alkali metal in excess of stoichiometric requirements may be used successfully. The unreacted excess alkali metal is recovered in the process. One method of determining whether or not an excess of alkali metal has been added is to use the technique of gradual addition of alkali metal under constant shearing action, and intermittently stop the agitation and allow the dispersion to stand for 30 minutes. If a precipitate of alkali metal forms or a sludge separates, it is an indication that sufficient alkali metal has been added.

The addition of carbon dioxide may take place simultaneously with the addition of alkali metal or the former step can be carried out after the completion of the latter. No particular precautions need be taken during the addition of the carbon dioxide except to insure intimate contact. This may be accomplished by the use of jets or agitators during the process of adding the carbon dioxide.

It is obvious from the foregoing description that certain changes can be made in the process without departing from the invention. As used throughout the specification and claims, the term "poly" is intended to means two or more substituent groups. The only limitations attaching to the invention appear in the appended claims.

What is claimed is:

1. A synthetic monomeric ester lubricant consisting essentially of the reaction product of at least stoichiometric amounts of
   (1) complex polynuclear aromatic carboxylic acids derived from solvent extracts obtained in the solvent refining of mineral lubricating oils with a solvent selective for aromatic compounds by metalation of said solvent extracts to form the alkali metal adduct, carbonation of said adduct to form the corresponding alkali metal salt of the carboxylic acid and acidification of said salt to form the free carboxylic acid characterized by being complex, polynuclear, aromatic, alkyl-aromatic compounds predominating in carbon and hydrogen, containing about 2.0 to 4.5 weight percent of sulfur, having a molecular weight of above about 320 and having about 1.7 to 3.5 average number of aromatic rings per aromatic molecule and
   (2) a monohydroxyl-organic compound of the group consisting of alkanols of 1 to 18 carbon atoms per molecule, benzyl alcohol, benzhydrol, triphenylcarbinol, phenol, cresols, xylenols, and naphthols
under esterification conditions at a temperature of about 100° to 250° F.

2. A synthetic lubricant in accordance with claim 1 in which said complex carboxylic acids have a saponification value of about 221 and an average molecular weight of about 630.

3. A synthetic lubricant in accordance with claim 1 in which said complex carboxylic acids have a saponification value of about 186 and an average molecular weight of about 680.

4. A synthetic lubricant in accordance with claim 1 in which said complex carboxylic acids have a saponification value of about 186 and an average molecular weight of about 700.

5. A synthetic lubricant in accordance with claim 1 in which said monohydroxyl-organic compound is an alkanol having 1 to 18 carbon atoms.

6. A synthetic lubricant in accordance with claim 5 in which said alkanol is n-butanol.

7. A synthetic lubricant in accordance with claim 6 in which said alkanol is stearyl alcohol.

8. A synthetic monomeric ester lubricant consisting essentially of the reaction product of
   (1) complex carboxylic acids derived from phenol extracts, obtained in the phenol extraction of mineral lubricating oils to prepare 170 vis./100 V.I. mineral oil, said acids being prepared by metalation of said phenol extract to form the sodium adduct, carbonation of said sodium adduct to form the corresponding sodium salt of the carboxylic acid and acidification of said salt to form the free carboxylic acid, said carboxylic acid characterized by being complex, polynuclear, aromatic, alkyl-aromatic compounds predominating in carbon and hydrogen, containing about 2.0 to 4.5 weight percent of sulfur, having about 1.7 to 3.5 average number of aromatic rings per aromatic molecule, having a saponification value of about 221 and an average molecular weight of about 630 and a stoichiometric excess of
   (2) n-butanol
under esterification conditions at a temperature sufficient to remove water formed from the reaction.

9. A synthetic monomeric ester lubricant consisting essentially of the reaction product of
   (1) complex carboxylic acids derived from phenol extracts, obtained in the phenol extraction of mineral lubricating oils to prepare 170 vis./100 V.I. mineral oil, said acids being prepared by metalation of said phenol extract to form the sodium adduct, carbonation of said sodium adduct to form the corresponding sodium salt of the carboxylic acid and acidification of said salt to form the free carboxylic acid, said carboxylic acid characterized by being complex, polynuclear, aromatic, alkyl-aromatic compounds predominating in carbon and hydrogen, containing about 2.0 to 4.5 weight percent of sulfur, having about 1.7 to 3.5 average number of aromatic rings per aromatic molecule, having a saponification value of about 186 and an average molecular weight of about 680 and a stoichiometric excess of
   (2) stearyl alcohol
under esterification conditions at a temperature of about 160° C.

10. A synthetic monomeric ester lubricant consisting essentially of the reaction product of
    (1) complex carboxylic acids derived from phenol extracts, obtained in the phenol extraction of mineral lubricating oils to prepare 170 vis./100 V.I. mineral oil, said acids being prepared by metalation of said phenol extract to form the sodium adduct, carbonation of said sodium adduct to form the corresponding sodium salt of the carboxylic acid and acidification of said salt to form the free carboxylic acid, said carboxylic acid characterized by being complex, polynuclear, aromatic, alkyl-aromatic compounds predominating in carbon and hydrogen, containing about 2.0 to 4.5 weight percent of sulfur, having about 1.7 to 3.5 average number of aromatic rings per aromatic molecule, having a saponification value of about 221 and an average molecular weight of about 630 and a stoichiometric excess of
    (2) phenol under esterification conditions at a temperature sufficient to remove water formed from the reaction.

11. A synthetic monomeric ester lubricant consisting essentially of the reaction product of
(1) complex carboxylic acids derived from phenol extracts, obtained in the phenol extraction of mineral lubricating oils to prepare 170 vis./100 V.I. mineral oil, said acids being prepared by metalation of said phenol extract to form the sodium adduct, carbonation of said sodium adduct to form the corresponding sodium salt of the carboxylic acid and acidification of said salt to form the free carboxylic acid, said carboxylic acid characterized by being complex, polynuclear, aromatic, alkyl-aromatic compounds predominating in carbon and hydrogen, containing about 2.0 to 4.5 weight percent of sulfur, having about 1.7 to 3.5 average number of aromatic rings per aromatic molecule, having a saponification value of about 221 and an average molecular weight of about 700 and a stoichiometric excess of
(2) naphthol under esterification conditions at a temperature sufficient to remove water formed from the reaction.

12. A synthetic monomeric ester lubricant consisting essentially of the reaction product of
(1) complex carboxylic acids derived from phenol extracts, obtained in the phenol extraction of mineral lubricating oils to prepare 170 vis./100 V.I. mineral oil, said acids being prepared by metalation of said phenol extract to form the sodium adduct, carbonation of said sodium adduct to form the corresponding sodium salt of the carboxylic acid and acidification of said salt to form the free carboxylic acid, said carboxylic acid characterized by being complex, polynuclear, aromatic, alkyl-aromatic compounds predominating in carbon and hydrogen, containing about 2.0 to 4.5 weight percent of sulfur, having about 1.7 to 3.5 average number of aromatic rings per aromatic molecule, having a saponification value of about 186 and an average molecular weight of about 700 and a stoichiometric excess of
(2) beta-naphthol under esterification conditions at a temperature of about 200° C.

13. A synthetic monomeric ester lubricant consisting essentially of the reaction product of
(1) complex carboxylic acids derived from phenol extracts, obtained in the phenol extraction of mineral lubricating oils to prepare 170 vis./100 V.I. mineral oil, said acids being prepared by metalation of said phenol extract to form the sodium adduct, carbonation of said sodium adduct to form the corresponding sodium salt of the carboxylic acid and acidification of said salt to form the free carboxylic acid, said carboxylic acid characterized by being complex, polynuclear, aromatic, alkyl-aromatic compounds predominating in carbon and hydrogen, containing about 2.0 to 4.5 weight percent of sulfur, having about 1.7 to 3.5 average number of aromatic rings per aromatic molecule, having a saponification value of about 186 and an average molecular weight of about 680 and a stoichiometric excess of
(2) methyl alcohol under esterification conditions at a temperature of about 185° C.

References Cited in the file of this patent

UNITED STATES PATENTS

| | | |
|---|---|---|
| 2,027,000 | Scott | Jan. 7, 1936 |
| 2,231,788 | Adams et al. | Feb. 11, 1941 |
| 2,766,272 | Hetzel | Oct. 9, 1956 |
| 2,816,918 | Wynkoop et al. | Dec. 17, 1957 |
| 2,819,300 | Grosskinsky et al. | Jan. 7, 1958 |
| 2,823,231 | Raecke et al. | Feb. 11, 1958 |